United States Patent [19]

Corbin

[11] Patent Number: 5,190,331
[45] Date of Patent: Mar. 2, 1993

[54] HELICOPTER HOOK-UP AND STATIC ELECTRIC DISCHARGE DEVICE

[75] Inventor: Joseph G. Corbin, Castle Hayne, N.C.

[73] Assignee: Sky-Hook, Inc., Sanford, Me.

[21] Appl. No.: 647,962

[22] Filed: Jan. 30, 1991

[51] Int. Cl.$^5$ ............................ B25J 1/04; H05F 3/02
[52] U.S. Cl. ..................................... 294/24; 294/19.1; 361/212
[58] Field of Search ............... 294/1.1, 19.1, 22-24, 294/82.1, 82.26; 81/53.1; 174/5 R, 5 S, 5 G; 244/137.1, 137.4; 361/212, 218, 222

[56] References Cited

U.S. PATENT DOCUMENTS

| | | | |
|---|---|---|---|
| 149,575 | 4/1874 | Clendaniel et al. | 294/19.1 |
| 373,939 | 11/1887 | McLaren | 294/22 |
| 589,945 | 9/1897 | Groat | 294/24 |
| 729,443 | 5/1903 | Stowell | 294/24 |
| 734,180 | 7/1903 | Kanaly | 294/24 |
| 1,468,878 | 9/1923 | Donald | 294/22 |
| 2,716,570 | 8/1955 | Beeman | 294/22 |
| 3,891,165 | 6/1975 | Day et al. | 294/19.1 X |
| 3,893,005 | 7/1975 | Corbin | 294/19.1 X |
| 4,525,006 | 6/1985 | Nowak et al. | 294/19.1 |

FOREIGN PATENT DOCUMENTS

| | | | |
|---|---|---|---|
| 853340 | 10/1952 | Fed. Rep. of Germany | 294/19.1 |
| 2371800 | 7/1978 | France | 294/19.1 |
| 121068 | 6/1927 | Switzerland | 294/19.1 |
| 541713 | 12/1941 | United Kingdom | 294/19.1 |

*Primary Examiner*—Johnny D. Cherry
*Attorney, Agent, or Firm*—Lowe, Price, LeBlanc & Becker

[57] ABSTRACT

A multi-purpose hook-up head for attaching a variety of different hook-up assemblies to a hovering helicopter. The multi-purpose hook-up head includes a pair of spaced apart upper grip members each including a plurality of grip plates which are arranged to accept a variety of hook-up assemblies including metal apex shackles, metal apex rings and web rings of different sizes. The hook-up head is grounded through a hollow, insulated pole which serves as a handle to perform cargo hook-up operations.

21 Claims, 4 Drawing Sheets

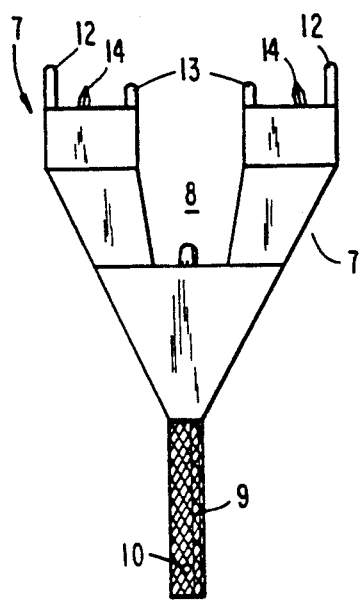
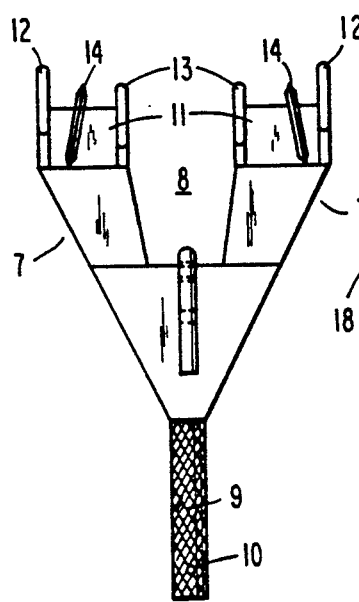
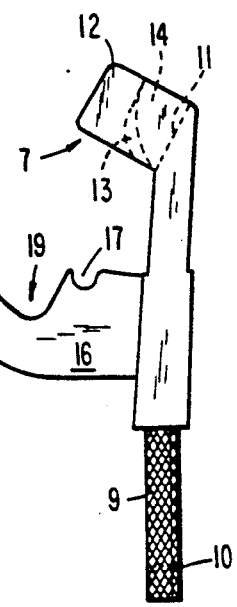
FIG. 2A              FIG. 2B              FIG. 2C
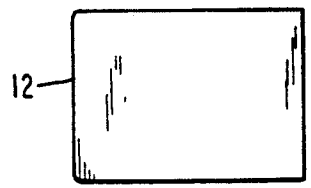
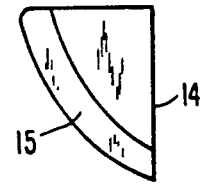
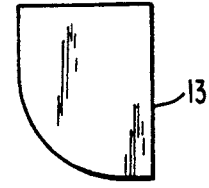
FIG. 3A              FIG. 3B              FIG. 3C

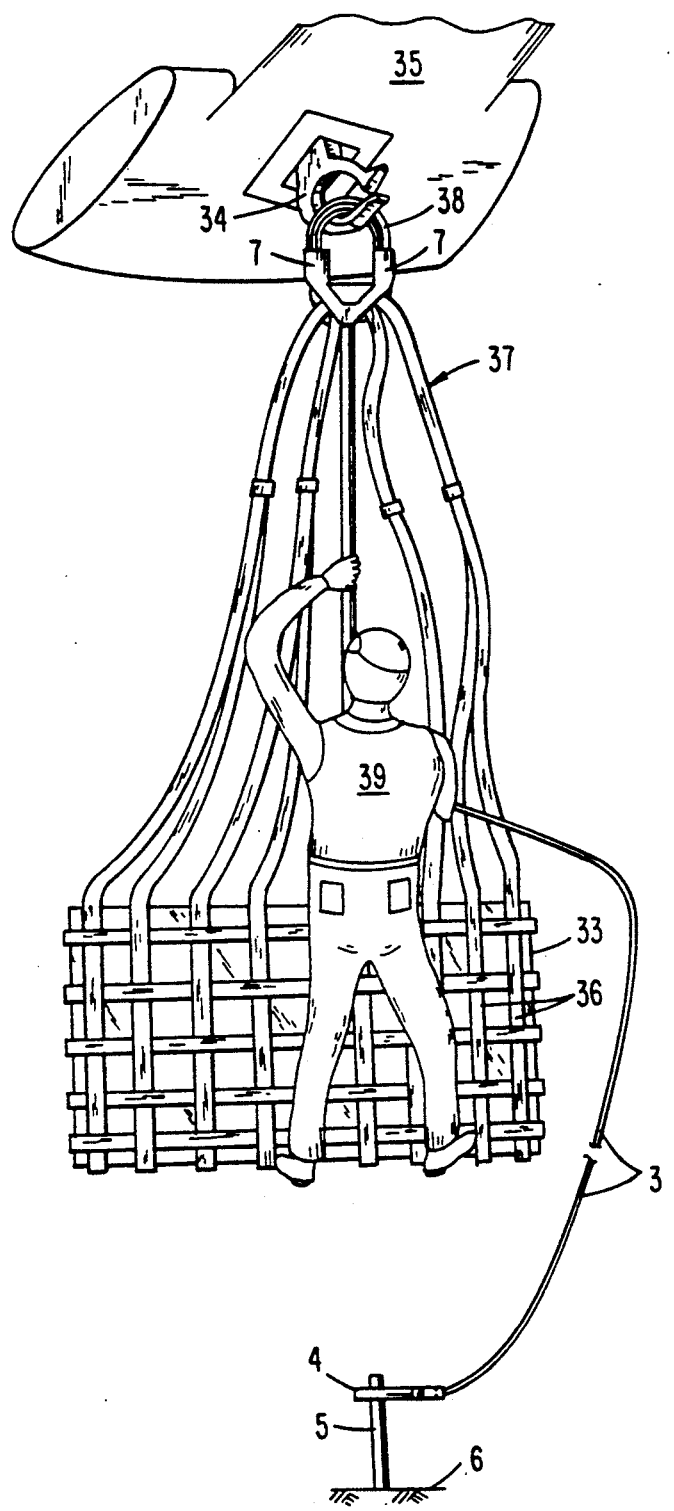
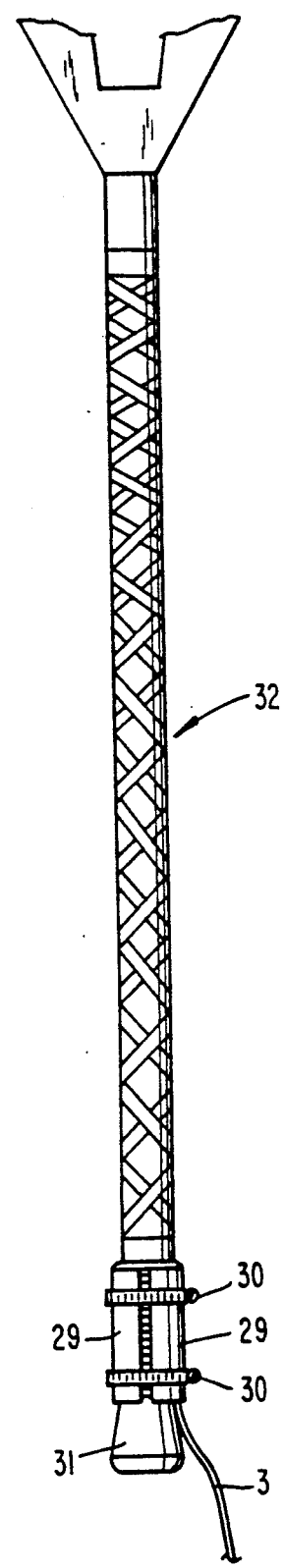
FIG. 7
FIG. 6

HELICOPTER HOOK-UP AND STATIC ELECTRIC DISCHARGE DEVICE

TECHNICAL FIELD

The present invention relates to an apparatus for the elimination of static electric shock in the hooking of external loads to helicopters. More particularly, the present invention relates to a hand-held grounded pole device and a novel multi-purpose hook-up head for hooking external loads to a hovering helicopter.

BACKGROUND ART

In flight, a helicopter generates and stores a charge of static electricity. Since the advent of helicopter external loading operations, helicopter support team personnel have been subjected to severe shock from this static electricity and the danger of being crushed between the aircraft and the external load during the hook-up phase of the cargo handling operation. Various wands, shepherd crooks and other devices have been utilized in an attempt to eliminate these hazards, but none have been completely satisfactory.

One method used by the armed forces for external helicopter loading requires the ground personnel to make the hook-up to the helicopter by hand. In this maneuver, the becket end of the sling is hooked to the aircraft lifting hook by a man who stands astride the proposed load under the hovering helicopter. This operation subjects the man to a severe, static electric shock and the danger of being crushed between the aircraft and the external load.

Shipboard loading is even more dangerous since the loader must contend not only with the helicopters' vertical and horizontal movements, but also with the movement of the ship in the case when the hook-up is being made at sea. This added motion, coupled with the static electric shock, makes the hand held hook-up method of shipboard hook-ups even more hazardous.

U.S. Pat. No. 3,893,005 to Corbin is directed to a grounded pole for attaching a load-carrying sling to a helicopter which includes a hollow extension pole made from a non-conducting material, a hook-up head attached to one end of the pole and made from a conductive material and a grounding cable connectable at one end to a grounding rod and connected at the other end through the lower end of the pole to a metallic plug. A wire braid extends through the bore of the pole to connect the plug to the hook-up head so as to conduct to the ground any static electricity which may be transferred from the helicopter to the hook-up head. The hook-up head of U.S. Pat. No. 3,893,005 was designed specifically to accept a nylon web ring apex, or donut utilized in conjunction with 15,000 pound cargo slings.

Over the passage of time, improvements in sling material and design have produced various types of sling assemblies. With these new sling assemblies, new hook-up assemblies which use hook-up rings or apex shackle fittings have been developed. The newer hook-up assemblies are made of various sizes for different lifting capacities and are made of metal or nylon webbing.

Since the hook-up head of U.S. Pat. No. 3,893,005 was specifically designed for use with a particular nylon web ring, the hook-up head of this patent cannot be utilized with other assemblies such as cargo net hook-up rings or metal apex shackle type fittings.

Thus, a definite need exists for a device which can be utilized with a variety of hook-up assemblies, including cargo net hook-up rings or metal apex shackle type fittings of various sizes.

DISCLOSURE OF THE INVENTION

Accordingly, one object of the present invention is to eliminate the danger of static electric shock to a person who is externally hooking a load to a hovering helicopter.

Another object of the present invention is to provide a safe, rapid method of hooking-up external loads to a hovering helicopter.

Another object of the present invention is to provide a person, who is externally hooking a load to a hovering helicopter, with a safe distance between the aircraft and the load.

A further object of the present invention is to permit a person who is hooking a load to a hovering helicopter to do so from a ground plane rather than from the top of the load itself.

An even further object of the present invention is to provide a novel multi-purpose hook-up head which will accept and work with any hook-up assembly, including metal and web hook-up rings, cargo net hook-up rings, and apex shackle fittings of various sizes.

A still further object of the present invention is to provide a multi-purpose hook-up head which can be utilized to attach hook-up assemblies to a hovering helicopter in at least two directions.

According to the present invention there is provided a device for attaching a plurality of different hook-up assemblies to an elevated hook which comprises:

a pole member; and a hook-up head attached to one end of the pole member, the hook-up head comprising a main body portion having a pair of spaced apart upper grip members, each including an outer, central, and inner grip plate, and an arcuate lifting arm support member extending from one side of the main body portion.

Other objects, advantages and novel features of the present invention will become apparent from the following detailed description of the invention.

BRIEF DESCRIPTION OF DRAWINGS

The present invention will be described with reference to the annexed drawings which are given for illustrative purpose only in which:

FIGS. 2A, 2B and 2C are rear, front, and side views, respectively, of the multi-purpose hook-up head according to one embodiment of the present invention.

FIGS. 3A–3C are side views of the outer, central, and inner grip plates, respectively, of the upper grip members according to one embodiment of the present invention.

FIG. 6 is a view of the pole showing the boot, semi-cylindrical cover members and clamps.

FIG. 7 is a perspective view of a person utilizing the device of the present invention.

BEST MODE FOR CARRYING OUT THE INVENTION

The present invention is directed to a multi-purpose hook-up head for attaching a load-carrying hook-up assembly to a helicopter. The device includes a hollow extension pole made of a non-conducting material to which the multi-purpose hook-up head is attached. At a distant end of the pole opposite to the end at which the multi-purpose hook-up head is attached, a metal plug is attached and connected to a grounding cable which is connectable at a free end thereof to a grounding rod or other grounded structure. A wire braid extends through the hollow extension pole to connect the metal plug to the multi-purpose hook-up head so as to effectively ground the multi-purpose hook-up head which is made from a metal material.

In operation, a loading crew member attaches a hook-up assembly such as a metal hook-up ring or apex shackle fitting or nylon web ring to the multi-purpose hook-up head and, holding the hollow non-conductive extension pole, attaches the hook-up assembly to a carrying hook of a helicopter.

A particular novel feature of the present invention is that the multi-purpose hook-up head is designed to receive various types of hook-up assemblies including metal hook-up rings and apex shackle fittings of various sizes in addition to nylon web rings. In this regard, the multi-purpose hook-up head is provided with a pair of upper grip members and a lower arcuate support member, each provided with a plurality of structural elements designed to receive various types and sizes of hook-up assemblies.

Figure 1:
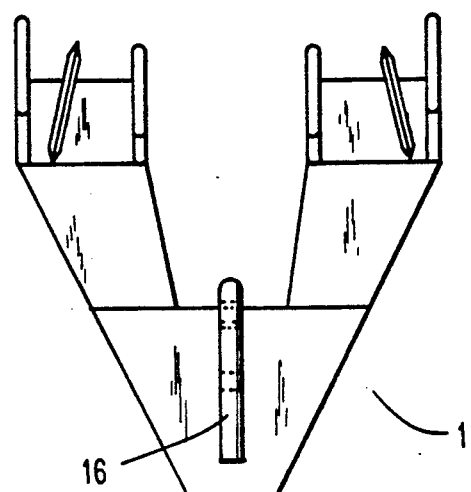
FIG. 1 is a front view, partially broken away, of one embodiment of the present invention.
Figure 1:
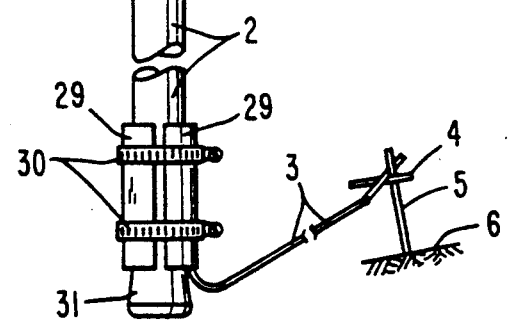

FIG. 1 is a front, partially broken away, view of one embodiment of the present invention. As illustrated in FIG. 1, a grounding/sling attacher device made according to the present invention includes a hook-up head 1 attached to an upper end of a pole 2. A grounding cable 3 capable of conducting an electrical charge is attached at one end to a clamp 4 which is attached to a suitable metallic grounding rod 5, for example, a brass, aluminum, steel or copper rod, which is inserted into the ground 6. At the other end, the cable's center conductor is attached to a plug in the pole 2 as will be described herebelow.

The pole is typically about 5 to 6 feet long and preferably about 5 foot 3 inches long with an I.D. of about 1 inch. The hollow pole is made of a non-conductive material having suitable strength, such as fiberglass.

The hook-up head 1 is shown in its front view in FIG. 1. However, the details of the multi-purpose hook-up head 1 are best illustrated in FIGS. 2A–2C. In the rear view of the multi-purpose hook-up head illustrated in FIG. 2A, it can be seen that the head comprises a main body portion having a generally Y-shaped structure with the pair of upper grip members 7 located at the top portion thereof. Between the pair of upper grip members a slot 8 is provided which, as will be understood as the description of the multi-purpose hook-up head is presented, allows for a hook-up operation to be performed in either of two directions. The slot 8 is provided so as to avoid obstruction of the center of a hook-up assembly held by the multi-purpose head. The lower portion of the multi-purpose hook-up head comprises a metal plug 9 having a cylindrical shape. The plug comprises a 1 inch diameter piece of aluminum approximately 9–10 inches long which is knurled along more than one half its length at a lower portion thereof and machine tapered along the remaining length. The plug has a threaded hole 10 at its lower end which is drilled and tapped to receive a machine screw.

Each of the upper grip members includes a head back plate 11 and a plurality of grip plates which extend outwardly from the surface of the head back plate. The head back plate 11, as best illustrated in FIG. 2C, is provided at an angle of about 30° from the plug member, so that the grip plate members each extend at an obtuse angle with respect to the main body portion of the hook-up head.

The plurality of grip plates include an outer grip plate 12 which is positioned at the outermost edge of the head back plate 11, an inner grip plate 13 which is positioned adjacent the slot formed between the pair of upper grip members, and a central grip plate 14 which is mounted to be slightly inclined upwardly toward the inner grip plate 13 as illustrated. The inner and outer grip plates are each substantially parallel as illustrated.

The grip plates are illustrated in FIGS. 3A–C. The outer grip plate as best illustrated in FIGS. 3A and 2C has a substantially rectangular shape. The inner grip plate 13 as illustrated in FIG. 3C and in the broken lines in FIG. 2C has a curved lower portion. The central grip plate 14 as illustrated in FIG. 3B and in the broken lines in FIG. 2C has a substantially curved configuration on the portion opposite the head back plate and a beveled edge 15 on the curved edge thereof.

The multi-purpose hook-up head includes an arcuate lifting arm member 16 which extends from the branched portion of the generally Y-shape of the hook-up head in the same general direction which the grip plates extend. The arcuate lifting arm member includes a base portion having a slot 17 and an extending narrow portion 18 forming a stepped area 19.

The multi-purpose hook-up head is constructed of ballistic or hardened aluminum to provide for durability and weight reduction. In an alternate embodiment, the multi-purpose hook-up head could be cast or molded from a carbonized epoxy and fiberglass filler laced with aluminum so as to provide maximum strength as well as conductivity to receive and remove static charges.

A metallic plug 20 (FIG. 5) is inserted at the bottom of the pole 2. This plug is a straight cylinder without any narrowed segment. The metallic plug has a threaded hole at the top designed to receive a machine screw 21 for securing to the plug a grounding strap 22 which passes through the hollow center portion of pole 2. The metallic plug 20 also includes a smooth flat surface area 23 formed in an upper circumferential surface portion and a threaded hole 24 located within the flat surface area 23 approximately one-third of the way down from the top of the metallic plug. Except for the smooth flat surface area 23, the metallic plug is knurled on its outer circumferential surface.

Figure 5:
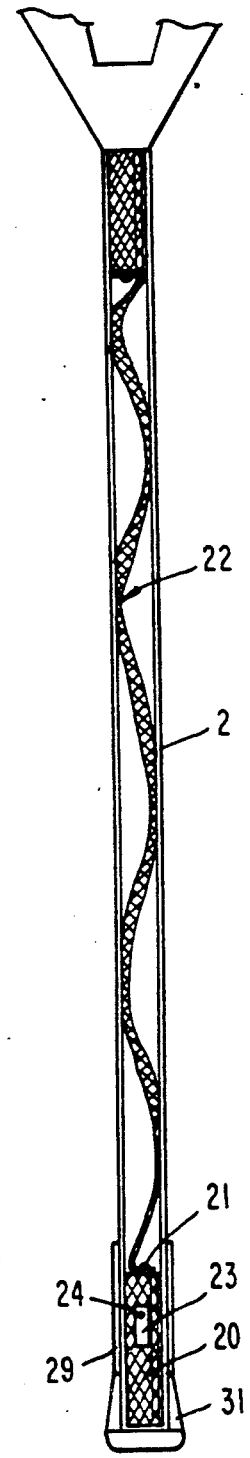
FIG. 5 is a cut-away view through the pole.

As illustrated in FIG. 5, a metallic conductor, e.g., a flat grounding strap 22 with connector lugs on each end is fastened to the top and bottom plugs, respectively, by putting screws through the connector lugs and screwing the screws in the threaded holes in the respective plugs. The plugs are then securely fixed in place in the ends of pole 2, preferably with an epoxy resin or other cement.

Figure 4:
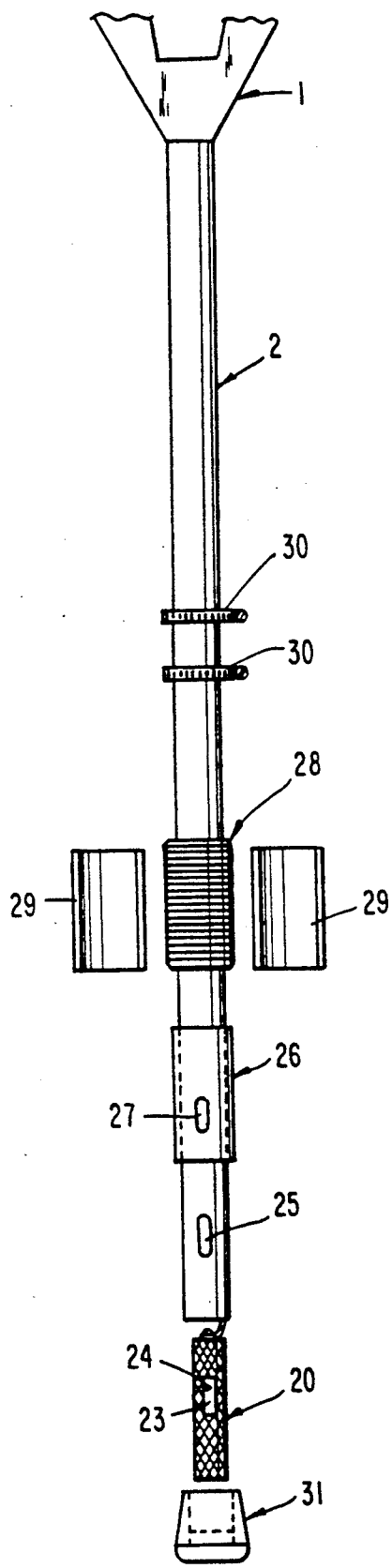
FIG. 4 is a partially exploded view illustrating the elements which are utilized to secure a grounding to the bottom of the pole.

A slot 25 is cut through the pole 2 in such a way as to expose the smooth flat area 23 and threaded hole 24 in the side of the metallic plug 20 when metallic plug 20 is secured in pole 2 (FIG. 4). A fiberglass reinforcing sleeve member 26 which is slidably positioned on the outer surface of pole 2 is similarly provided with a slot 27 that is alignable with slot 25 in the pole 2. The inner diameter of the reinforcing sleeve member is slightly larger than the outer diameter of pole 2 to allow for a sliding fit about the pole.

After sleeve member 26 is positioned on pole 2 so that slots 25 and 27 are aligned, the end of grounding cable 3 opposite to that attached to clamp 4 is placed in the slot 25 and fastened down to the smooth flat area 23 of metallic plug 20 by inserting a machine screw through a connector lug attached to the end of the grounding cable and securing the screw into threaded hole 24 so that the cable conductor makes electric contact with metallic plug 20.

After the grounding cable 3 is secured to metallic plug 20, rubber protection boot member 28 is then placed over the pole 2 to cover the reinforcing sleeve 26 and electrically insulate the connecting attachment of the ground cable 3 to the metallic plug 20. As can be appreciated, the smooth flat area 23 of metallic plug 20 is suitably dimensioned, e.g., approximately ⅜ inches by b 2 inches, so that when attached, the connecting lug on the ground cable makes a substantially flat contact with the metallic plug 20.

A pair of substantially semi-cylindrical cover members 29 are placed around the rubber boot member 28 and secured thereto by clamp members 30 which may comprise conventional hose clamps. When secured by the clamp members 30, the semi-cylindrical cover members 29 function to fasten the rubber protection boot 28 and the grounding cable 3 firmly against the lower portion of pole 2 so that movement of the pole 2 with the grounding cable attached to a ground, e.g., grounding rod, does not cause the grounding cable to become detached from the metallic plug 20.

A protecting cap 31, preferably rubber, is placed over the bottom end of the pole as illustrated.

FIG. 6 illustrates the manner in which the rubber protection boot member 28, semi-cylindrical cover members 29 and clamp members 30 are assembled together. FIG. 6 also illustrates protecting cap 31 and an optional manner in which a friction or grip tape 32 may be applied to pole 2.

It should be obvious to one of ordinary skill that there are many ways to construct the grounding and attachment device within the spirit of this invention. For example, the cable 3 could enter the bottom of the pole 2 and be attached to the bottom plug by a machine screw, the plug having a threaded hole therein extending upwardly from its bottom surface.

In an exemplary operation, utilizing a suitable load such as a crate 33 to be carried on a carrying hook 34 beneath a helicopter 35 utilizing a suitable cargo net 36, the load is placed in the cargo net 36 and the sling legs or straps 37 are looped around what it known as a "donut" 38. The donut is simply a lifting ring formed from a circle of loops of a strap held together by one of more fasteners.

When the sling legs or straps 37 are coupled to the donut 38, the donut is placed into the upper grip members 7 with one side of the donut in each upper grip pair members. The bottom of the donut is positioned to be supported on the arcuate lifting arm member 16 so as to be held thereby.

The crew member 39 who is doing the loading now lifts the hook-up head 1 by means of the pole 2 with the rear of the hook-up head either facing towards or away from him and, as the helicopter hovers above him, slips the donut 38 over the helicopter's cargo hook 34. He then pulls the hook-up head backward or forward as necessary to release the donut 38 from the hook-up head 1. The donut 38 stays on the hook 34 and the helicopter 35 is ready to rise with the load as soon as the man steps back out of the way.

When the helicopter is carrying a charge of static electricity, a discharge will take place from the helicopter to the hook-up head. The electricity will then be grounded through the path created by the hook-up head, top plug, grounding strap inside the pole, bottom plug, grounding cable, clamp and grounding rod.

The person is protected from the static-electricity discharge since he is holding the non-conducting pole and has no contact with any of the metallic parts.

As discussed above, the multi-purpose hook-up head of the present invention is designed to releasably receive various types of hook-up assemblies, including nylon web rings, metal apex shackle fittings of various sizes and metal rings of various sizes. In this regard, the inner and outer grip plates are positioned a sufficient distance apart to receive a nylon web ring. When receiving a nylon web ring, the central grip plate is designed with a beveled projecting edge 15 and is suitably inclined inwardly in an upward direction so that the central grip plate may easily slide between adjacent loops of a nylon web ring. In this regard, it can be appreciated that the central grip plates are inclined slightly inward in an upward direction so as to be complementary to the direction of curvature of the loops of the nylon web ring. When utilizing the multi-purpose hook-up head with a web ring, the arcuate lifting arm member 16 is designed to support the web ring at the stepped portion 19.

When utilizing the multi-purpose hook-up head of the present invention with a metal apex shackle fitting, the shackle fitting is supported on the stepped portion 19 of the arcuate lifting arm member 16 with the upper arms of the shackle being received between the inner and central grip plates. Additionally, central grip plate 14 is inclined so as to follow the outer contour of a metal apex shackle fitting for holding it in an approximately vertical hook-up position. In this regard, the distance between the upper portion of the central grip plate 14 and the inner grip plate 13 is suitably determined to receive a large metal apex shackle fitting (designed to support a 40,000 pound capacity cargo sling). While designed to support a large shackle fitting, the multi-purpose hook-up head can be utilized for other smaller metal apex shackle fittings such as those designed to support 10,000 pound and 25,000 pound capacity cargo slings.

When utilizing the multi-purpose hook-up head with a metal hook-up ring, the hook-up ring can be supported in the slot 17 of the arcuate lifting arm member 16 with the upper portion of the metal hook-up ring positioned between the central and inner grip plate members. In this regard, the inner grip plate members are spaced close enough together to receive a metal ring suitable for lifting either a 5,000 or 10,000 pound cargo net.

Although the dimensions of the multi-purpose hookup head can be easily determined by the above description, which describes the manner in which the grip head receives web rings, metal apex shackles and metal apex rings, the following non-limiting dimensions are given for illustrative purposes.

Plug Height, 9½ inches;

Distance from Bottom of Plug to Uppermost Tip of Arcuate Member, approximately 10½ inches;

Distance from Bottom of Plug to Upper Top of Upper Grip Members, about 15⅜ inches;

Distance from Bottom of Plug to Bottom of Grip Members, approximately 12½ inches;

Distance Between Inner Sides of Inner and Outer Grip Plates, approximately 2-5/32 inches;

Width of Slot, approximately 3¼ inches;

Length of Outer Grip Member (Extending From Head Back Plate), approximately 2-9/16 inches;

Length of Inner Grip Member, approximately 1½ inches;

Height of Plate Grip Member, approximately 2⅛ inches;

Length of Arcuate Member, approximately 5¾ inches.

Although the present invention is described with reference to particular means, materials and embodiments, from the foregoing description, one skilled in the art can ascertain the essential characteristics of the present invention and various changes and modifications may be made to adapt the various uses and characteristics thereof without departing from the spirit and scope of the present invention as described in the claims which follow.

What is claimed is:

1. A device for attaching a one of different hook-up assemblies to an elevated hook which comprises:
   a pole member; and
   a hook-up head attached to one end of said pole member,
   said hook-up head comprising a main body portion having a pair of spaced apart upper grip members, each including an outer, central, and inner grip plate extending from a common side of the associated upper grip member, and a lifting arm support member extending from said main body portion.

2. The device of claim 1, wherein said lifting arm support member includes a stepped portion and a slot in an upper surface thereof, receiving selected ones of different hook-up assemblies.

3. The device of claim 1, wherein said hook-up head is made from a conductive material.

4. The device of claim 3, wherein said hook-up head is made from aluminum.

5. The device of claim 3, wherein said hook-up head is made from a composition comprising carbonized epoxy, a fiberglass filler and metal particles.

6. The device of claim 1, wherein said main body portion is a generally y-shaped body in plan view.

7. The device of claim 1, wherein said pole member has a gripping surface made from a non-conductive material.

8. The device of claim 7, wherein said pole member is hollow.

9. The device of claim 8, wherein said hook-up head includes a portion which extends partially within said hollow pole member.

10. The device of claim 8, wherein said pole member includes a conductive plug in an end distant from the end to which the hook-up head is attached.

11. The device of claim 10, further including an electrical conductor which extends through a hollow portion of said pole member and is attached to said hook-up head and said conductive plug.

12. The device of claim 11, further including an electrical grounding conductor which is externally connected to said conductive plug.

13. The device of claim 10, wherein said conductive plug is externally covered with an insulating material.

14. A device for attaching a one of different hook-up assemblies to an elevated hook, comprising:
    a pole member; and
    a hook-up head attached to said pole member,
    said hook-up head including a main body portion having a pair of spaced apart upper grip members, each grip member including an outer grip plate, a central grip plate, and an inner grip plate, said hook-up head further including a lifting arm support member extending from one side of said main body portion so as to be contactable with one of said hook-up assemblies in cooperation with said upper grip members to support said hook-up assembly on the devices, wherein each of said outer, central and inner grip plates on each of said upper grip members extend from a common surface of said upper grip member with said outer and inner grip plates being parallel to each other and said central grip plate being inclined with respect to said outer grip plate.

15. The device of claim 14, wherein each of said outer, central and inner grip plates on each of said upper grip members extend from said common surface of said grip member at an obtuse angle with respect to a longitudinal axis of said main body portion.

16. The device of claim 14, wherein each of said central grip plates includes a curved, beveled outer edge.

17. The device of claim 14, wherein said lifting arm support member extends in substantially the same direction as each of said grip plates.

18. A device for attaching a one of different hook-up assemblies to an elevated hook, comprising:
    a pole member; and
    a hook-up head attached to said pole member, said hook-up head including a main body portion having a pair of spaced apart upper grip members, each upper grip member including first and second plates contactable with a part of said hook-up assembly, and a lifting arm supporting member extending from said main body portion to be contactable with another part of said hook-up assembly to enable the first and second plates of each upper grip member to support said hook-up assembly on said lifting device in cooperation with said lifting arm support member, wherein each of said first and second plates includes an outwardly directed surface projecting forwardly from the main body portion in the same direction as said lifting arm support member, each outwardly directly surface being one of an angled or an arcuate surface extending in such a direction that the extent to which said surface projects forwardly from the associated upper grip member decreases in a downward direction toward the lifting arm support member.

19. The device of claim 18, wherein said first plates are outwardly spaced from the second plates and are inclined toward the second plates in an upwardly extending direction.

20. The device of claim 19, wherein said arcuate or angled surface is beveled.

21. The device of claim 19, wherein said lifting arm support member includes, in an upwardly facing surface thereof, a step and a slot positioned closer to the pole member than said step to respectively receive and support one of a shackle or a lifting ring as said hook-up assembly.

* * * * *